3,214,185
CONTROL MEANS FOR A MOTOR VEHICLE SUSPENSION SYSTEM OF THE PNEUMATIC TYPE
Richard O. Mason, Barrie L. Wilson, and Robert D. Dickmeyer, Fort Wayne, Ind., assignors to International Harvester Company, Chicago, Ill., a corporation of New Jersey
Filed Mar. 5, 1962, Ser. No. 177,474
5 Claims. (Cl. 280—6.1)

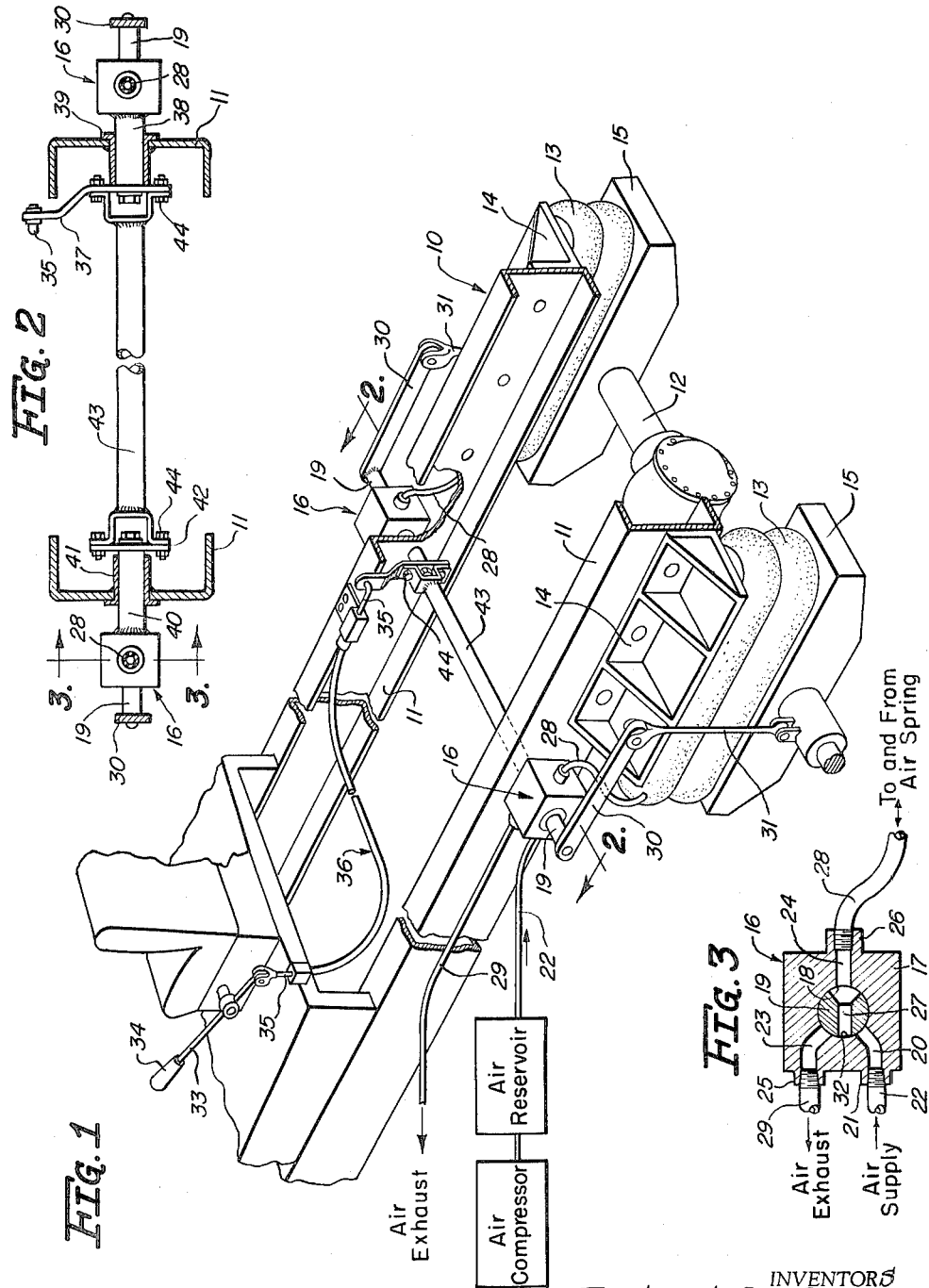

This invention relates to motor vehicle suspension systems and more particularly to a new and improved manually operable height control means for a vehicle suspension system embodying pneumatic cushioning devices for supporting the chassis frame of the vehicle on the running gear or axles thereof.

In recent years there has been a trend in the motor truck industry toward the utilization of pneumatic springs, as distinguished from steel springs of the leaf and coil type in motor vehicle axle suspension systems because of certain operating advantages, one of which is a constant ride height, such suspension systems afford over prior conventional suspension system. In most instances the pneumatic suspension system includes a pneumatic cushioning device such as bellows, flexible bag or the like which is, in effect, interposed between the vehicle chassis frame and the axle. The pneumatic cushioning device is usually inflated with compressed air of a magnitude necessary to support and maintain the sprung mass such as the chassis frame a preselected predetermined distance or normal design level above the unsprung mass such as the axle and running gear of the vehicle. Inasmuch as the static load imposed upon the vehicle is variable, pneumatic suspension systems generally employ a control device which is responsive to a change in the predetermined designed trim or standing height of the chassis frame off the ground or the clearance distance between the spring mass and the unsprung mass caused by the variance in the load conditions of the vehicle to automatically re-establish the predetermined clearance or trim height by regulating the internal pressure condition within the air cushion device. For the most part, the control device is in the form of a self-leveling valve which is operatively positioned between the positive or compressed air supply and the pneumatic cushioning device and controls the supply and exhaust of air to and from the pneumatic cushioning device through a single conduit extending between the leveling valve and the pneumatic cushioning device. Valve actuating linkage means connected between the unsprung and sprung masses are employed in such a manner that as the vehicle load is increased and the vehicle frame approaches the axle, the pressure within the pneumatic cushioning device is increased to bring the chassis frame back to its predetermined clearance height or level and similarly as the vehicle load decreased and the vehicle chassis frame moves upwardly with respect to the axle, the air pressure within the pneumatic cushioning device is exhausted until the chassis frame is returned to the predetermined clearance height or level.

Heretofore, vehicle air sprung suspension systems have been primarily concerned with maintaining the vehicle frame at one established level above the axle regardless of vehicle loading. Oftentimes, in the operation of motor trucks, it is desirable to be able to vary the predetermined clearance or normal designed height between the sprung and unsprung masses and establish other levels. As an example, loading and unloading operations of the motor truck body are facilitated if the bed or floor of the truck body is flush or in horizontal alignment with the loading dock or platform. Heretofore, there was no simple and foolproof control means for adjusting the frame height in the event the truck body bed was not flush with the edge of the loading dock. It is, therefore, one of the important objects of the present invention to provide control means used in conjunction with a motor vehicle pneumatic suspension system by which the vehicle operator may raise or lower the suspended portion of the motor truck preselected amounts above or below the normal designed clearance height and to establish an infinite number of new clearance or trim heights.

A further object is to provide a manually operable control means constructed and arranged so as to establish and maintain an infinite number of different values of clearance height between the sprung mass and the unsprung mass of the vehicle.

A still further object is to incorporate a manual override control means in a motor vehicle pneumatic suspension system to selectively vary the clearance height of the vehicle chassis irrespective of the load upon the vehicle.

Another object is to provide a simple and inexpensive height control means for a motor vehicle utilizing pneumatic cushioning devices for supporting the chassis frame of the vehicle on the running gear thereof which enables the height of the vehicle frame above the axle to be established at a multitude of selected levels and which does not effect the leveling action of the leveling valve to maintain the vehicle frame at the selected level in response to a change in load conditions on the vehicle imposed upon the vehicle frame.

The foregoing and other important objects and desirable features inherent in and encompassed by the invention together with many of the purposes and uses thereof will become readily apparent from a reading of the ensuing description in conjunction with the annexed drawing, in which:

FIGURE 1 is a diagrammatic perspective view of a portion of a motor vehicle having the new and improved manually operable height control means incorporated therein;

FIGURE 2 is a vertical sectional view taken substantially along line 2—2 of FIGURE 1, and FIGURE 3 is a vertical sectional view taken substantially along line 3—3 of FIGURE 2.

Referring to the drawings in detail wherein like reference characters represent like elements throughout the sprung mass in the form of a chassis frame 10 is partially shown. The chassis frame includes a pair of longitudinally extending transversely spaced channel-shaped side sill members 11—11 which are rigidly interconnected by means of a plurality of longitudinally spaced transversely extending cross members (not shown). The unsprung mass includes a transversely extending axle assembly 12 spaced below the load-carrying body portion or vehicle chassis frame 10. The axle assembly 12 and the chassis frame 10 are conventional and therefore will not be described in further detail. Referring to the schematic illustration of FIGURE 1 the chassis frame 10 or sprung mass is supported upon the axle assembly 12 or unsprung mass of the vehicle by means of a pair of air springs 13. Each air spring 13 and the associated control means therefor is an exact structural duplicate of the other air spring assembly. The air springs 13 are preferably of the expansible bellows type of units adapted to receive air under pressure sufficient to normally support the load of the chassis frame 10 upon the axle assembly 12. When the load in the sprung mass, that is, the chasis of the vehicle is increased, air under pressure is supplied to the air springs 13 to offset the increase in load and thereby maintain the clearance height between the sprung mass and the unsprung mass at a relatively constant value. Similarly, when the load in the vehicle decreases air is exhausted from the air springs 13 to again compensate for the loss of load to maintain the clearance height at the relatively constant value. Each air spring 13 is sandwiched between and suitably secured to an upper bracket 14 and a lower bracket 15 which are rigidly secured to the frame 10 and axle assembly 12 respectively.

The clearance height between the sprung mass 10 and the unsprung mass 12 is regulated and established by means of a pair of air control or leveling valves 16, each of which is carried on the outboard side of a respective side sill member 11 adjacent one of the air springs 13 in a novel manner that will be pointed out hereinafter. The control valves 16 are conventional three-way valves and each includes a valve body 17 having a central cylindrical bore 18 extending therethrough in which a valve element or shaft 19 is journalled for oscillatory movement. The valve body 17 of each control valve 16 is provided with an air inlet port 20 which extends from the bore 18 to an air inlet pipe fitting 21 on the outer surface of the valve body 17. One end of a pipe or conduit 22 is connected to the air inlet fitting 21 and the opposite end of the conduit 22 is in fluid communication with a source of positive pressure such as an air reservoir, which in turn, receives air under pressure from an engine-driven air compressor, of a predetermined value as in conventional installations. The valve body 17 is also provided with an air exhaust port 23 and an air supply-exhaust port 24 which lead to pipe fittings 25 and 26, respectively, and also open into the bore 18. As illustrated in FIGURE 3, the innermost ends of the ports 20, 23 and 24 are circumferentially or angularly spaced with respect to each other. The valve element 19 of each leveling valve 16 has a diametrically extending passageway 27 extending therethrough. One end of the passageway 27 is continually in fluid communication with the innermost end of the airsupply exhaust port 24 throughout the entire range of oscillatory movement of the valve element and the opposite end of the passageway 27 is positionable to be in fluid communication with either the inner end of the air inlet port 20 or the inner end of the air exhaust port 23 or neither port 20, 23 upon oscillation of the valve element 19 with respect to the valve body 17 throughout its entire range of relative oscillatory movement. Each pipe fitting 26 has a flexible conduit 28 connected thereto and the opposite end of each conduit 28 is operatively connected to a respective air spring 13. In a similar manner each pipe fitting 25 has a conduit 29 connected thereto which leads to the atmosphere. Thus, when the passageways 27 are positioned to be in fluid communication with the air inlet ports 20 air under pressure is supplied to the air springs 13 through the conduits 28 to supply additional air under pressure to the air springs 13, and conversely, when the passageways 27 are in fluid communication with the air exhaust ports 23 air under pressure is allowed to exhaust through the conduits 28 and 29. However, when the valve elements 19 are in positions illustrated in FIGURE 3 corresponding to their neutral positions, air is neither being supplied or being exhausted from the springs 13.

Each valve element 19 is oscillated to each of its three conditions of operation by means of valve actuating structure which includes an arm 30 rigidly secured to the outer end portion of the valve element 19 disposed exteriorly of the valve body 17 and a link 31 having one end pivotally connected to the free end of the arm 30 and its opposite end pivotally connected to the unsprung mass or axle assembly 12. From the foregoing it will be appreciated that when the load in the vehicle increases tending to compress the air springs 13, the valve actuating structures will oscillate the valve elements 19 with respect to the valve bodies 17 in a counterclockwise direction from their neutral positions, as viewed in FIGURE 3, to condition the leveling valves 16 to supply additional air under pressure to the springs 13 and thereby compensate for the increase in load. The additional air expands the air springs 13 and raises the chassis frame 10 to oscillate the valve elements 19 in the opposite direction until the prese- lected, normal designed clearance height is restored and the passageway 27 is out of fluid communication with the ports 20 and 23. Similarly when the load decreases in the vehicle, the actuating structures oscillate the valve elements 19 in a clockwise direction, as viewed in FIGURE 3, to positions wherein the leveling valves 16 are conditioned to allow air under pressure to exhaust from the air springs 13 through the conduit 29. The exhausting of air continues until the chassis frame 10 is lowered to its predetermined normal designed clearance height whereupon fluid communication between the passageway 27 and the port 23 is disestablished. From the foregoing, it will be appreciated that the leveling valves 16 in conjunction with the valve actuating structures automatically restore the sprung mass of the vehicle to a predetermined, normal designed clearance height with respect to the unsprung mass of the vehicle. It will also be appreciated that the rotative or angular position of each valve element 19 with respect to its valve body 17 is critical since the clearance height desired to be maintained and designed into the suspension system is established when the valve elements 19 are in their neutral positions and the passageways 27 are neither in fluid communication with the air inlet ports 20 nor the air exhaust ports 23 but rather are closed by the arcuate wall portions 32 partially defining the bores 18 extending between the ports 20 and 23. While a particular leveling valve construction has been described in detail, it is to be understood that leveling valves of different construction but employing an oscillatory valve element for effecting the various operating conditions of the valve could be utilized without departing from the spirit and scope of the invention. Furthermore, the foregoing operational characteristics of the leveling valves 16 in establishing and maintaining a predetermined clearance height between the sprung mass and unsprung mass of a vehicle described hereinbefore is conventional.

As pointed out hereinbefore there are many occasions in the operation of motor vehicles when it is desirable to change the height relationship between the sprung and unsprung masses and establish new clearance heights which are different from the predetermined normal designed clearance height. The height control means to be described presently not only enables the vehicle operator to vary the level of the vehicle frame 10 with respect to the axle assembly 12 and establish an infinite number of different vehicle frame levels but also is constructed and arranged to maintain the new established level automatically regardless of changes in vehicle loading and without requiring the constant attention of the vehicle operator. The height control means includes a hand lever 33 having a portion intermediate its ends connected to the operator's compartment structure adjacent the operator's seat structure so that the hand grip portion formed on one end 34 of the hand lever 33 is convenient to be grasped by the vehicle operator to rock the hand lever 33 without the necessity of leaving the operator's compartment. The end of the lever 33 opposite the hand grip portion 34 is pivotally connected to the inner cable wire 35 of a Bowden wire cable assembly 36. The outer sheath 37 of the Bowden wire assembly 36 has one end secured to the operator's compartment structure and its opposite end rigidly supported on one of the side sill members 11, as shown in FIGURE 1. The end of the wire cable 35 opposite the end attached to the hand lever 33 is pivotally connected to the free end of an actuating arm 37. The actuating arm 37 is rigidly connected to one end of a stub shaft 38 which extends transversely through the web portion of the adjacent side sill member 11 and is journalled for rocking movement in a bearing member 39 carried by side sill member 11. The outwardly disposed end of the stub shaft 38 is rigidly secured to the valve body 17 of the adjacent leveling valve 16 by welding or the like. The leveling valve 16 disposed on the other side of the chassis frame 10 is similarly secured to a stub shaft 40 which extends transversely inwardly through the side sill member 11 and which is supported for rocking rotation in a bearing member 41 carried by the web portion of the side sill member 11. Rigidly secured to the innermost end of the stub shaft 40 is a plate 42. A rockshaft 43 extends transversely between and is rigidly connected to the plate 42 and the actuating arm 37 by means of a plurality of nut and bolt assemblies 44.

From the foregoing it will be appreciated that both valve bodies 17 are pivotally supported on the chassis frame 10 for relative rocking movement in unison about a common transversely extending axis to various angular positions with respect to the chassis frame 10 and the vehicle operator can, merely by rocking the hand lever 33, effect simultaneous pivoting of the valve bodies 17 of the leveling valves 16 to the various angular positions with respect to the chassis frame 10 and, momentarily, with respect to the valve elements 19. It is to be understood that the frictional resistance encountered in the Bowden wire cable assembly 36 and the structure for pivotally supporting the hand lever 33 is sufficient to maintain the adjusted angular setting or position of the valve bodies 17 with respect to the chassis frame 10. It will talso be appreciated that when the valve bodies 17 are angularly adjusted to new positions by the manually operable height control means the angular position of each arcuate wall portion 32 is simultaneously adjusted to a new angular position.

Thus it will be apparent that the angular relationship of the valve bodies 17 with respect to the valve elements 19 and hence the angular relationship of the passageway 27 with respect to the ports 20, 23 and wall portion 32 may be manually adjusted by the height control means.

In use assuming the vehicle frame 10 to be at a predetermined clearance height and the valve elements 19 are in the neutral positions as shown in FIGURE 3 and the vehicle operator desires to establish a new and larger clearance height the vehicle operator rocks the hand lever 33 in a direction to effect clockwise rotation of the valve bodies 17 with respect to the chassis frame 10. Since the valve elements 19 are momentarily held stationary by means of the actuating arms 30 and the links 31 the valve bodies 17 also oscillate in a clockwise direction as viewed in FIGURE 3 with respect to the valve elements 19. As a result the leveling valves 16 are conditioned to permit compressed air flow from the conduit 22 to the supply-exhaust conduit 28 and thence to the air springs 13 to further inflate them as the air springs 13 are being inflated the chassis frame 10 is being raised and approaches the new selected clearance level. Simultaneously with the raising of the chassis frame 10 to the new selected clearance level the valve elements 19 are rotated in a clockwise direction as viewed in FIGURE 3 through the intermediary of the actuating arms 30 and the links 31. Until the leveling valves 16 are again in their neutral positions with neither the exhaust port 23 nor the inlet port 20 in fluid communication with the passageway 27. When the leveling valves 16 are in their neutral conditions the chassis frame 10 will be at the new selected clearance height of increased value and such new clearance height will be maintained by the leveling valves 16 operating in a conventional manner regardless of changes in vehicle loading thereafter until the vehicle operator again selects a different clearance height. To lower the chassis frame the valve bodies 17 are pivoted in an opposite or counterclockwise direction as viewed in FIGURE 3 and instead of supplying the air springs 13 with compressed air, air is permitted to be exhausted from the air springs 13 until the desired vehicle frame level is reached whereupon the leveling valve 16 function to maintain the established level of the vehicle frame regardless of vehicle loading. The valve bodies 17 will be maintained in their re-positioned angular relationship and the ability to vary such angular relationship of the valve bodies is under complete control of the vehicle operator.

The embodiment of the invention chosen for the purposes of illustration and description herein is that preferred for achieving the objects of the invention and developing the utility thereof in the most desirable manner, due regard being had to existing factors of economy, simplicity of design and construction and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. In a fluid suspension system for controlling the clearance height between the unsprung mass and the sprung mass including a longitudinal chassis frame of a vehicle, comprising, a source of fluid under pressure; a fluid expansible spring positioned between the unsprung mass and the chassis frame of the vehicle; height control means responsive to changes in clearance height between the chassis frame and the unsprung mass for controlling inflation and deflation of said spring to thereby maintain a predetermined height relationship between said chassis frame and said unsprung mass including a transversely extending shaft journalled in said chassis frame, a leveling valve structure connected to said source of fluid under pressure and said spring and including a valve body rigidly secured to one end of said shaft, said leveling valve structure further including a valve element rotatable with respect to said valve body in opposite directions from a neutral setting corresponding to said predetermined height relationship between said chassis frame and said unsprung mass wherein fluid is neither being supplied nor being exhausted from said spring to a first position wherein fluid is supplied to said spring and a second position where fluid is exhausted from said spring, said valve body having a predetermined rotative attitude with respect to the rotational axis of said shaft when said valve element is in its neutral setting and said predetermined height relationship between said chassis frame and said unsprung mass is being maintained, said height control means further including actuating means operatively connected to said valve element and said unsprung mass to be responsive to variations in the height relationship between said chassis frame and said unsprung mass to rotate said valve element with respect to said valve body; and manually operable adjustment means for rocking said shaft and said valve body to vary the rotative attitude of said valve body with respect to the rotational axis of said shaft and establish different height relationships between said chassis frame and said unsprung mass.

2. In a fluid suspension system for controlling the clearance height between the unsprung mass and sprung mass including a longitudinal chassis frame of a vehicle, comprising, a source of fluid under pressure; a fluid expansible spring positioned between the unsprung mass and the chassis frame of the vehicle; height control means responsive to changes in clearance height between the chassis frame and the unsprung mass for controlling inflation and deflation of said spring to thereby maintain a predetermined height relationship between said chassis frame and said unsprung mass including a leveling valve structure connected to said source of fluid under pressure and said spring and including a valve body adjustably mounted on said frame for relative rocking movement about a transversely extending fixed axis extending therethrough, said leveling valve structure further including a valve element supported by said valve body for relative rocking movement, the rocking axis of said valve element being coincident with said fixed axis, said valve element being rockable with respect to said valve body in opposite directions from a neutral setting corresponding to the predetermined height relationship between said chassis frame and said unsprung mass whereby fluid is neither being supplied to nor being exhausted from said spring to a first position wherein fluid is supplied to said spring and a second position wherein fluid is exhausted from said spring, said valve bory having a predetermined rotative attitude with respect to said fixed axis when said valve element is in its neutral setting and said predetermined height relationship between said chassis frame and said unsprung mass is being maintained, said height control means further including actuating means operatively connected to said valve element and said unsprung mass to be responsive to variations in the height relationship between said chassis frame and said unsprung mass to rock said valve element with respect to said valve body; and manually operable adjustment means for rocking said valve body with respect to said valve element about said fixed axis to vary the rotative attitude thereof with respect to said fixed axis and establish different height relationships between the said chassis frame and said unsprung mass.

3. In a fluid suspension system for controlling the clearance height between the unsprung mass and the sprung mass of a vehicle, said sprung mass including a longitudinal chassis frame having a channel-shaped side sill member, comprising, a source of fluid under pressure; a fluid expansible spring position between the unsprung mass and the chassis frame of the vehicle; height control means responsive to changes in clearance height between the chassis frame and the unsprung mass for controlling inflation and deflation of said spring to thereby maintain a predetermined height relationship between said chassis frame and said unsprung mass including a shaft extending transversely through and journalled in the web portion of said side sill member, one end of said shaft projecting transversely outwardly from said side sill member, a leveling valve structure connected to said source of fluid under pressure and said spring, and including a valve body rigidly secured to the projecting outermost end of said shaft, said leveling valve structure further including a valve element supported by said valve body for relative rocking movement, the rocking axis of said valve element being coincident with the rotational axis of said shaft, said valve element being rockable with respect to said valve body in opposite directions from a neutral setting corresponding to the predetermined height relationship between said chassis frame and said unsprung mass whereby fluid is neither being supplied to nor being exhausted from said spring to a first position wherein fluid is supplied to said spring and a second position wherein fluid is exhausted from said spring, said valve body having a predetermined rotative attitude with respect to the rotational axis of said shaft when said valve element is in its neutral setting and said predetermined height relationship between said chassis frame and said unsprung mass is being maintained, said height control means further including linkage means operatively connected to said valve element and said unsprung mass to be responsive to variations in the height relationship between said chassis frame and said unsprung mass to rotate said valve element with respect to said valve body; and manually operable adjustment means for rocking said shaft and said valve body to vary the rotative attitude of said valve body with respect to the rotational axis of said shaft and establish different height relationships between said chassis frame and said unsprung mass.

4. In a fluid suspension system for controlling the clearance height between the unsprung mass and the sprung mass of a vehicle, said sprung mass including a longitudinal chassis frame and an operator's compartment mounted upon said chassis frame, said operator's compartment being longitudinally spaced and remote from said unsprung mass, comprising, a source of fluid under pressure; a pair of fluid expansible spring means positioned between the unsprung mass and each transverse side of the chassis frame of the vehicle; height control means responsive to changes in clearance height between the chassis frame and the unsprung mass for controlling inflation and deflation of said spring means to thereby maintain a predetermined height relationship between said chassis frame and said unsprung mass including a transversely extending shaft supported by said chassis frame for relative rocking movement, the ends of said shaft projecting transversely outwardly from the sides of said chassis frame, a pair of leveling valve structures in fluid communication with said source of fluid under pressure, each of said leveling valve structures being in fluid communication with a respective spring means and including a valve body rigidly secured to a respective end of said shaft, each of said leveling valve structures further including a valve element supported by the valve body thereof for relative rocking movement, the rocking axes of said valve elements being coincident with the rotational axis of said shaft, each of said valve elements being rockable with respect to its associated valve body in opposite directions from a neutral setting corresponding to the predetermined height relationship between said chassis frame and said unsprung mass whereby fluid is neither being supplied to nor being exhausted from said spring means associated therewith to a first position wherein fluid is supplied to said spring means and a second position wherein fluid is exhausted from said spring means, each of said valve bodies having a predetermined rotative attitude with respect to the rotational axis of said shaft when the valve element associated therewith is in its neutral setting and said predetermined height relationship between said chassis frame and said unsprung mass is being maintained, said height control means further including a pair of linkage means, each of said linkage means being operatively connected to a respective valve element and said unsprung mass to be responsive to variations in the height relationship between said chassis frame and said unsprung mass to rotate said valve element with respect to its associated valve body; and adjustment means for rocking said shaft and said valve bodies in unison to vary the rotative attitude of said valve bodies with respect to the rotational axis of said shaft and establish different height relationships between said chassis frame and said unsprung mass, said adjustment means including manually operable force transmitting means extending between said operator's compartment and shaft whereby said shaft and valve bodies are capable of being rocked from said operator's compartment.

5. In a fluid suspension system as set forth in claim 4, wherein said manually operable force transmitting means includes an arm having one end fixed to said shaft and extending radially therefrom, a hand lever pivotally mounted in said operator's compartment and a Bowden cable wire structure extending between and operatively connected to the free end of said arm and said hand lever whereby pivoting of said hand lever effects rocking of said shaft.

References Cited by the Examiner
UNITED STATES PATENTS 2,443,433   6/48   Sanmori _____ 280—124
2,939,723   6/60   Wisniewski.
2,978,256   4/61   Bertsch.

A. HARRY LEVY, *Primary Examiner.*

LEO FRIAGLIA, *Examiner.*